United States Patent [19]
Shumaker

[11] 3,870,560
[45] Mar. 11, 1975

[54] SILICATE-AND HYDROXIDE-CONTAINING CLEANING COMPOSITIONS, AND LIQUID CONCENTRATES FOR THE PREPARATION THEREOF

[75] Inventor: Gary Allen Shumaker, Ashtabula, Ohio

[73] Assignee: The Lubrizol Corporation, Thickliffe, Ohio

[22] Filed: Jan. 2, 1973

[21] Appl. No.: 320,343

[52] U.S. Cl..................... 134/2, 252/156, 252/527, 252/DIG. 14; DIG. 17
[51] Int. Cl............................ C23g 1/14, C11d 3/08
[58] Field of Search .... 252/156, 192, 527, DIG. 14, 252/DIG. 17; 134/2

[56] References Cited
FOREIGN PATENTS OR APPLICATIONS
7,002,091  8/1971  Netherlands
1,301,784  1/1973  Great Britain Primary Examiner—Leland A. Sebastian
Attorney, Agent, or Firm—J. Walter Adams, Jr.; William H. Pittman

[57] ABSTRACT

Liquid concentrates, suitable for the preparation of cleaning solutions for metal surfaces, contain at least 20% dissolved solids by weight and comprise an aqueous solution of about 15–25% of an alkali metal hydroxide, about 35–45% of an alkali metal silicate, about 1–5% of an organic sequestrant, and about 2–15% of an anionic surfactant. Cleaning compositions prepared by dissolution of these concentrates in water, particularly compositions consisting essentially of the recited ingredients, are useful for cleaning metal surfaces prior to phosphating.

24 Claims, No Drawings

SILICATE-AND HYDROXIDE-CONTAINING CLEANING COMPOSITIONS, AND LIQUID CONCENTRATES FOR THE PREPARATION THEREOF

This invention relates to compositions suitable for cleaning metal surfaces, and to liquid concentrates useful in their preparation. More particularly, it relates to a liquid cleaning concentrate containing at least 20% dissolved solids by weight, which comprises an aqueous solution of about 15–25% by weight of at least one alkali metal hydroxide, about 35–45% of at least one alkali metal silicate, about 1–5% of at least one organic sequestrant, and about 2–15% of at least one anionic surfactant.

The use of silicate-containing aqueous systems as heavy-duty industrial cleaners for metal surfaces, particularly prior to the deposition of a conversion coating such as a phosphate, oxalate or chromate coating, has been known for some time. Such cleaning solutions are generally prepared by the dissolution in water of a dry concentrate. For many purposes it would be more convenient to use a liquid concentrate than a solid one since liquids are more readily soluble in water and can be measured out more easily than solids, and are also capable of being pumped rather than carried from one location to another. However, the formulation of liquid cleaning concentrates is difficult since the necessary ingredients are often not soluble in water at the high concentrations in which they would be present in a concentrate.

A principal object of the present invention, therefore, is to prepare novel cleaning solutions for metal surfaces.

A further object is to prepare liquid concentrates which may be dissolved in water to produce such cleaning solutions.

A further object is to produce homogeneous liquid concentrates containing the ingredients for the formation of a cleaning solution for metal surfaces.

A further object is to provide an improved method for cleaning metal surfaces prior to deposition of a conversion coating thereon.

Other objects will in part be obvious and will in part appear hereinafter.

As previously mentioned, the major ingredients in the compositions of this invention are alkali metal hydroxides and silicates. Sodium and potassium are the preferred alkali metals, and either or both may be present in the composition.

The silicate may be any of the water-soluble silicates, includng orthosilicate, metasilicate, disilicate, or the mixture of sodium silicates known as "waterglass". Especially useful are the liquid silicates, which generally have a silica to alkali metal oxide mole ratio greater than 1:1. A particular preference is expressed for those in which the silica to alkali metal oxide mole ratio is between about 1.6:1 and 4.0:1.

The liquid silicates are preferred because they are generally more soluble than solid or "crystalloidal" silicates. For this reason, the choice of the silicate and hydroxide is preferably made so as to avoid the formation of a crystalloidal material in the concentrate. In general, therefore, it is preferred that the ratio of silica to sodium oxide in the solution be kept above 1:1, and this is conveniently done by employing a liquid sodium silicate and using potassium hydroxide as the alkali metal hydroxide.

As organic sequestrants, the most useful materials are the polycarboxylic α-amino acids and their salts described in U.S. Pat. No. 2,758,949. Examples are ethylenediaminetetraacetic acid, trimethylenediaminetetraacetic acid, nitrilotriacetic acid and their alkali metal salts.

The preferred anionic surfactants are the water-soluble ones listed in *McCutcheon's Determents and Emulsifiers Annual* as being suitable for metal cleaning or industrial use. These include but are not limited to water-soluble hydrocarbon sulfonic acid salts, alkylolamides, organic phosphates, and alkoxylated (especially ethoxylated) derivatives thereof.

The concentrate composition will contain at least about 20% and preferably at least about 40% dissolved solids. From the standpoint of economy, it is of course desirable to keep the dissolved solids content as high and the water content as low as possible. On the other hand, it is also desirable that the amount of water in the concentrate be sufficient to prevent solidification or precipitation under normal conditions encountered during shipping and storage of the concentrate.

The concentrates of this invention are conveniently prepared by merely blending the various ingredients in any desired order. Usually, it is preferred to employ concentrated aqueous solutions of the alkali metal hydroxide and the sequestrant, and to use a liquid alkali metal silicate. In many instances, these concentrated solutions contain enough water to dissolve all of the ingredients and no additional water is necessary. However, additional water may be added as needed.

A typical cleaning concentrate according to the present invention is prepared by blending the following ingredients in the order given, with stirring. The amount of each active ingredient (excluding water) is given in parentheses.

| | |
|---|---|
| Potassium hydroxide (45% aqueous solution) | 42.2% (19.0%) |
| Sodium silicate, SiO$_2$:Na$_2$O mole ratio about 2.5:1 | 38.4% (38.4%) |
| Sodium salt of ethylenediaminetetraacetic acid (40% aqueous solution) | 6.5% (2.6%) |
| "Triton H-66" organic phosphate anionic surfactant | 2.5% (2.5%) |
| "Gafac RA-600" organic phosphate anionic surfactant | 0.8% (0.8%) |
| Potassium salt of "Triton DF-20" ethoxylated anionic surfactant | 9.6% (5.3%) |

For use, concentrates such as the ones described above are dissolved in water to a concentration of about 0.5–5.0% by weight, typically 2.8%. The aqueous cleaner thus prepared is also within the scope of this invention; the preferred cleaners consist essentially of aqueous solutions of the above-described alkali metal hydroxides and silicates, sequestrants and surfactants. The cleaner is contacted with the metal surface by spraying, dipping or the like, preferably at a temperature of about 50°–100°C. Contact between the metal and the cleaner is continued for a period of time sufficient to remove foreign matter, especially persistent foreign matter such as drawing oils, from the metal surface, usually about 30 seconds to 1 minute. The surface is then preferably rinsed with water, after which a conversion coating, typically a phosphate coating, may be applied thereto by conventional methods.

What is claimed is:

1. A liquid cleaning concentrate containing at least 20% dissolved solids by weight, which comprises an aqueous solution of about 15–25% of at least one alkali metal hydroxide, about 35–45% of at least one alkali metal silicate, about 1–5% of at least one organic sequestrant, and about 2–15% of at least one anionic surfactant.

2. A concentrate according to claim 1 wherein the alkali metal is at least one of sodium and potassium.

3. A concentrate according to claim 2 wherein the alkali metal silicate has a silica to alkali metal oxide mole ratio between about 1.6:1 and 4.0:1.

4. A concentrate according to claim 3 which contains at least about 40% dissolved solids.

5. A concentrate according to claim 3 wherein the organic sequestrant is a polycarboxylic α-amino acid or a salt thereof.

6. A concentrate according to claim 5 wherein the alkali metal is a mixture of sodium and potassium.

7. A concentrate according to claim 6 wherein the sequestrant is ethylenediaminetetraacetic acid or an alkali metal salt thereof.

8. A concentrate according to claim 6 wherein the alkali metal hydroxide is potassium hydroxide and the alkali metal silicate is sodium silicate containing a silica to sodium oxide mole ratio of about 2.58:1.

9. A concentrate according to claim 8 wherein the organic sequestrant is ethylenediaminetetraacetic acid or an alkali metal salt thereof.

10. A concentrate according to claim 9 which contains at least about 40% dissolved solids.

11. A cleaning composition comprising an aqueous solution containing about 0.5–5.0% by weight of a concentrate according to claim 1.

12. A cleaning composition comprising an aqueous solution containing about 0.5–5.0% by weight of a concentrate according to claim 3.

13. A cleaning composition according to claim 12 which consists essentially of the recited ingredients.

14. A cleaning composition comprising an aqueous solution containing about 0.5–5.0% by weight of a concentrate according to claim 5.

15. A cleaning composition comprising an aqueous solution containing about 0.5–5.0% by weight of a concentrate according to claim 8.

16. A cleaning composition according to claim 15 which consists essentially of the recited ingredients.

17. A composition according to claim 16 wherein the organic sequestrant is ethylenediaminetetraacetic acid or an alkali metal salt thereof.

18. A method of cleaning a metal object which comprises contacting said object with a composition according to claim 11.

19. A method of cleaning a metal object which comprises contacting said object with a composition according to claim 12.

20. A method of cleaning a metal object which comprises contacting said object with a composition according to claim 13.

21. A method of cleaning a metal object which comprises contacting said object with a composition according to claim 14.

22. A method of cleaning a metal object which comprises contacting said object with a composition according to claim 15.

23. A method of cleaning a metal object which comprises contacting said object with a composition according to claim 16.

24. A method of cleaning a metal object which comprises contacting said object with a composition according to claim 17.

* * * * *